United States Patent
Panz et al.

(10) Patent No.: US 10,106,426 B2
(45) Date of Patent: Oct. 23, 2018

(54) METHOD FOR THE SEPARATION OF METAL IONS THAT ARE DIVALENT OR HIGHER FROM STRONG ACIDS OR HIGHLY ACIDIC MEDIA

(71) Applicant: Evonik Degussa GmbH, Essen (DE)

(72) Inventors: Christian Panz, Wesseling-Berz (DE); Florian Paulat, Marne (DE); Guido Titz, Heimbach (DE); Sven Müller, Bonn (DE); Peter Erlhöfer, Wesseling (DE); Markus Ruf, Alfter-Witters (DE); Bodo Frings, Schloss Holte (DE); Hartwig Rauleder, Rheinfelden (DE); Thomas Barthel, Frankfurt am Main (DE); Mustafa Siray, Bonn (DE); Jürgen Behnisch, Rheinbach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/959,926

(22) Filed: Dec. 4, 2015

(65) Prior Publication Data

US 2016/0207785 A1  Jul. 21, 2016

Related U.S. Application Data

(63) Continuation of application No. 14/000,934, filed as application No. PCT/EP2012/052254 on Feb. 10, 2012.

(30) Foreign Application Priority Data

Feb. 22, 2011  (DE) .......................... 10 2011 004 533

(51) Int. Cl.

| | |
|---|---|
| *C01B 33/12* | (2006.01) |
| *C01B 33/193* | (2006.01) |
| *B01J 39/04* | (2017.01) |
| *B01J 39/18* | (2017.01) |
| *B01J 39/16* | (2017.01) |
| *B01J 49/53* | (2017.01) |

(52) U.S. Cl.
CPC ............. *C01B 33/128* (2013.01); *B01J 39/04* (2013.01); *B01J 39/16* (2013.01); *B01J 39/18* (2013.01); *B01J 49/53* (2017.01); *C01B 33/193* (2013.01)

(58) Field of Classification Search
CPC ..... C01B 33/20; C01B 33/128; C01B 33/193; B01J 49/53; B01J 39/04; B01J 39/16; B01J 39/18
USPC ........................................................ 423/339
See application file for complete search history.

(56) References Cited

U.S. PATENT DOCUMENTS

| | | |
|---|---|---|
| 4,372,858 A | 2/1983 | Ritter |
| 4,857,290 A | 8/1989 | Shimizu |
| 6,440,856 B1 | 8/2002 | Bessho et al. |
| 2014/0079620 A1 | 3/2014 | Panz et al. |

FOREIGN PATENT DOCUMENTS

| | | |
|---|---|---|
| KR | 2002-0048404 A | 6/2002 |
| WO | 2010037702 | 4/2010 |

OTHER PUBLICATIONS

Trochimczuk, "Novel Ion-Exchange/Coordination Resin with Carboxyethyl Phosphate Ligands", European Polymer Journal, Pergamon Press Ltd. Oxford, GB, vol. 34, No. 7, Jul. 1, 1998.

Trochimczuk, "New Ion-Exchange/Coordination Resins with Carboxylate and Phosphate Functional Groups", European Polymer Journal, Pergamon Press Ltd. Oxford, GB, vol. 35, No. 8, Aug. 1, 1999.

International Search Report and Written Opinion, PCT/EP2012/052254, dated Jul. 4, 2012.

Laxness, "Lewatit TP 260 Product Information," Brochure, published Dec. 9, 2011 (5 pages).

*Primary Examiner* — James Fiorito

(74) *Attorney, Agent, or Firm* — Michael Best & Friedrich LLP

(57) ABSTRACT

The present invention relates to a method of purifying strong acids or strongly acidic media to remove di- and higher valent metal ions, which can be used within the context of the production of high-purity silica. The invention further relates to the use of special ion exchangers for carrying out the method according to the invention and the resultant high-purity silicas.

7 Claims, No Drawings

METHOD FOR THE SEPARATION OF METAL IONS THAT ARE DIVALENT OR HIGHER FROM STRONG ACIDS OR HIGHLY ACIDIC MEDIA

CROSS-REFERENCE TO RELATED APPLICATIONS

This patent application is continuation of Ser. No. 14/000,934, filed Nov. 27, 2013, which is a national stage filing under 35 U.S.C. 371 of International Application No. PCT/EP2012/052254, filed on Feb. 10, 2012, which claims the benefit of priority to German Patent Application No. 102011004533.3, filed on Feb. 22, 2011, the disclosures of which are incorporated by reference herein in their entireties. Priority to each application is hereby claimed.

FIELD OF THE INVENTION

The present invention relates to a method of purifying strong acids or strongly acidic media to remove di- and higher valent metal ions, which can be employed in the production of high-purity silica. The invention further relates to the use of special ion exchangers for carrying out the method according to the invention and the resultant high-purity silicas.

BACKGROUND

The starting point for the invention was the continuing demand for an effective and economical method of producing high-purity silica.

High-purity silica can be used for making so-called solar-grade silicon, which is required for the production of photovoltaic cells, and is therefore of enormous economic importance.

An advantageous method of producing high-purity silica using silicate solutions is described in document WO 2010/037702 A1. However, this method has the disadvantage that the silica obtained must undergo an expensive washing process and the washing medium used for this must be strongly acidic. The pH values of the washing acids used for silica washing must be below 2, especially preferably even below 0.5, and even at these low pH values, di- and higher valent metallic impurities are still adsorbed so strongly on the surface of the silica particles that large amounts of strongly acidic washing acid are required for cleaning. For this reason the existing method is not only cost-intensive, it also involves risks with respect to labour safety, especially when replacing the washing acid, especially as this process step also has a concomitant risk of introduction of impurities.

Another drawback of the method according to document WO 2010/037702 A1 is that contaminations of the silica with titanium ions in the conditions of the acidic washing process cannot be removed effectively. To tackle this problem, preferably a peroxide is added, which not only makes it possible to remove the titanium ions by complexation, but owing to the colour of the complex formed it also makes the progress of its removal visible.

However, peroxides in acidic media have the disadvantage that hydroxyl radicals form in the presence of iron(II) ions, which are usually present in the process (Fenton's reagent). These radicals constitute a very strong oxidizing agent and, because of their corrosive effects, require especially high-grade materials for the equipment, making the production process even more expensive.

One problem to be solved by the present invention was therefore to provide a method of producing high-purity silica that is less cost-intensive compared with the prior art. In particular the method should be improved so that the high consumption of acid for the expensive washing process can be reduced. Furthermore, this washing process should—also owing to the risks associated with the handling of strongly acidic media—be simplified. Finally, another problem was to improve the method to the extent that addition of peroxides is no longer required.

SUMMARY OF THE INVENTION

These problems are solved by the method described in the following description, the examples and the claims and by the use of special ion exchange resins within the context of the method.

DETAILED DESCRIPTION

The research was based on a method of production according to document WO 2010/037702 A1, in which high-purity silica is obtained by the process steps stated hereunder:
  a. producing a preparation from an acidifying agent or an acidifying agent and water with a pH of less than 2, preferably less than 1.5, especially preferably less than 1, quite especially preferably less than 0.5.
  b. preparing a silicate solution with a viscosity from 2 to 10000 poise.
  c. adding the silicate solution from step b. to the preparation from step a. in such a way that the pH of the resultant precipitate suspension always remains at a value less than 2, preferably less than 1.5, especially preferably less than 1 and quite especially preferably less than 0.5.
  d. separating and washing the silica obtained, wherein the washing medium has a pH of less than 2, preferably less than 1.5, especially preferably less than 1 and quite especially preferably less than 0.5.
  e. neutral washing of the silica with deionized water.
  f. drying of the silica obtained.

This research led to the unexpected result that all of the aforementioned problems can be solved by the use of at least one special ion-exchange resin of the phosphonate type. According to the invention, it is less important whether the ion-exchange resin is already brought in contact with the liquid phase of the precipitate suspension during precipitation of the silica, i.e. within process step c., or whether the washing medium only comes in contact with the ion-exchange resin within process step d. Preferably contact with the ion-exchange resin does not occur until the washing step, but prior contact with the liquid phase of the precipitate suspension is also possible according to the invention (ion exchange both on the acidic washing medium, and on the liquid phase of the precipitate suspension).

With a sufficiently large amount—relative to the silica to be purified—of the phosphonate ion exchanger used or with sufficient ion-exchange capacity thereof, it may be possible to omit the washing according to process step d. and achieve sufficient purification within process step c.

The invention has the particular advantage that the especially disturbing di- and higher valent metallic impurities or metal ions are bound very well by the phosphonate ion exchangers, whereas alkali ions pass through them without any problem. Passage of the alkali ions is not harmful, because they can be removed later by simple washing of the silica with deionized water. Although alkali ions represent the main contamination, the phosphonate ion exchangers have very good service lives as a result of good passage of the alkali ions. The disturbing di- and higher valent metal ions are in contrast only present in trace amounts in the silica to be purified and therefore have little impact on the service life.

The alkali salt burden contained in the acidic medium after carrying out the method according to the invention can for example be removed by utilizing the Donnan effect by means of an acid retardation process, as is used by a person skilled in the art for example within the context of the anodizing of aluminium by the Eloxal process. Special ion-exchange resins, which preferably contain quaternary amines as functional groups, are suitable for the acid retardation process; we may mention for example Lewatit® K 6387 from the company Lanxess.

Regeneration of the phosphonate ion exchangers is preferably carried out using an alkaline tartrate solution. The research, within the scope of which the method according to the invention was developed, in fact showed, surprisingly, that alkaline tartrate solution is also very suitable for removing tri- and higher valent metal ions, which are bound particularly strongly to the ion-exchange resin. However, regeneration is also possible with other reagents, in particular with those that form sufficiently strong complexes with the di- or higher valent metal ions separated from the silica. Suitable complexing agents are known by a person skilled in the art, for example alkaline citrate, oxalate or EDTA (ethylenediaminetetraacetate) solutions can be used. As well as the considerable saving of acid, an advantage of the method according to the invention is the possibility of obtaining the rare-earth metals that are present, from the solutions obtained during regeneration of the phosphonate ion exchangers.

Preferably the regeneration of the phosphonate ion exchanger, optionally also that of the ion exchanger used for an acid retardation process, is carried out within the timeframe of the silica production process, because this makes continuous silica production possible.

The so-called phosphonate ion exchangers usable according to the invention can be characterized in that they have at least one functional group of the phosphonate or of the phosphonic acid type. A "functional group of the phosphonic acid type" is to be understood as a structural unit of the formula R—P(O)(OH)$_2$, where R can represent any residue. Preferably the arbitrary residue R represents either a polymer or the ion-exchange resin itself or it makes combining with the latter possible—as a linkage. A functional group of the phosphonate type is derived according to the invention from any functional group of the phosphonic acid type, by deprotonating one or both of the acidic P-bound OH groups; it is less important, according to the invention, which counter-ion or which counter-ions have the functional group of the phosphonate type. Preferably, however, ion-exchange resins with alkali-phosphonate groups, i.e. phosphonate groups with alkali-metal counter-ions, are used for the invention. Especially preferred ion-exchange resins contain aminomethylphosphonic acid or aminomethylphosphonate functionalities; these are in particular structural units of the formula R—NHCH$_2$P(O)(OH)$_2$, as are contained for example in the chelating ion exchanger Lewatit® TP 260 from the company Lanxess AG. Moreover, it is possible according to the invention to use ion exchangers with structural units of the formula R—NR'CH$_2$P(O)(OH)$_2$, in which R' is, except hydrogen, any monovalent residue, which can be identical to or different from R.

Other ion exchangers that are preferably used for carrying out the invention are those that have two phosphonic acid or phosphonate groups on one carbon atom, i.e. possess a geminal bifunctionality or a structural unit of the formula RR'C[PO(OH)$_2$]$_2$, in which R' is any monovalent residue, which can be identical to or different from R; Diphonix® from the company Triskem may be mentioned as an example of an ion-exchange resin of this kind.

The present invention accordingly comprises an improved method of producing high-purity silica, in which a silicate solution with a viscosity from 0.1 to 10000 poise is added to a preparation with a pH of less than 2.0, containing an acidifying agent, with the proviso that during addition the pH is always less than 2.0 and the liquid phase of the precipitate suspension formed during addition is brought in contact, for the purpose of ion exchange, with at least one phosphonate ion exchanger.

Preferably the method according to the invention is carried out in such a way that the silica is separated from the precipitate suspension and is treated at least once with an acidic washing medium, whose pH is less than 2.0, before ion exchange is performed with at least one phosphonate ion exchanger on the acidic washing medium or within the washing step. In this embodiment, ion exchange on the precipitating acid or on the liquid phase of the precipitate suspension is no longer required.

However, it is also possible according to the invention to carry out, both on the precipitating acid, and on the acidic washing medium, in each case one ion exchange using at least one phosphonate ion exchanger.

Regarding the understanding and the range of applications of the methods of producing high-purity silica that are improved by the present invention, reference is made to the complete disclosure of document WO 2010/037702 A1 and this is incorporated in its entirety in this description.

The functionality according to the invention of the phosphonate ion exchangers is not as a rule affected by the presence of other functional groups in the exchanger resin. Rather, combination with other functional groups in the ion-exchange resin can sometimes be used intentionally. In this connection, we may refer for example to ion-exchange resins containing phosphonic acid or phosphonate groups, which additionally possess a sulphonic acid or sulphonate functionality and thus help to provide the necessary rapid exchange kinetics; an ion-exchange resin of this kind that can be used according to the invention is for example Purolite® S957. Moreover, phosphonate ion exchangers that additionally contain carboxyl groups can be used advantageously, such as the aforementioned ion exchanger Diphonix® from the company Triskem.

The carrier material or the chemical composition of the polymer, to which the functional groups of the phosphonate or phosphonic acid type are bound as a rule, is less important for the execution of the invention. However, ion-exchange resins are preferably used according to the invention whose—preferably crosslinked—carrier material is polystyrene, polyacrylate or a copolymer thereof. The loading of the ion-exchange resins used according to the invention is also less important, provided there is no loading with the higher valent ions that are to be separated. Usually the ion-exchange resins are supplied loaded with alkali-metal counter-ions, and can be used in this form directly for the invention.

The other characteristics of the ion-exchange resins usable according to the invention, such as bulk density, particle size distribution, density and ion exchange capacity are to be selected according to the type of apparatus and the process-engineering design of the equipment in which the ion exchange is to take place; it is not possible to generalize.

It is also less important whether a cocurrent, countercurrent, stratified-bed, multichamber, dual-flow, sandwich, mixed-bed or three-bed exchanger is used for carrying out the method according to the invention; the use of countercurrent exchangers is, however, preferred. Both column-type and membrane-type and all other known types of ion exchangers can be used according to the invention.

Moreover, the method of production according to the invention can be carried out not only in batch mode or discontinuously, but also in continuous mode.

It is generally to be pointed out that according to the invention it is of primary importance that the ion-exchange resin is brought in contact with the liquid phase of the precipitate suspension or the acidic washing medium. The precise process-engineering design of the process can be adapted to the particular circumstances and objectives; the corresponding design possibilities are known by a person skilled in the art.

In a special embodiment of the invention it is also possible to add at least one phosphonate ion exchanger that is soluble in the acidic medium used in silica production and carry out the ion exchange in the liquid phase.

There are no restrictions with respect to the chemical composition of the liquid phase of the precipitate suspension or of the acidic washing medium. Hydrochloric acid, phosphoric acid, nitric acid, sulphuric acid, chlorosulphonic acid, sulphuryl chloride, perchloric acid, formic acid and/or acetic acid in concentrated or dilute form as well as mixtures of the aforementioned acids can preferably be used in the method according to the invention. The aforementioned inorganic acids, i.e. mineral acids, and among these in particular sulphuric acid, are especially preferred. The ion exchangers containing phosphonic acid or phosphonate groups used according to the invention are characterized by high stability in contact with strong acidic media, so that acid washing can even take place at elevated temperatures.

The liquid phase of the precipitate suspension or the acidic washing medium is passed through the silica and the ion exchanger used according to the invention preferably—but not necessarily—separately from one another, which is in particular effected by pumping round the liquid in question in a circuit. For this pumping-round, the solids through which the liquid is to be passed are contained in any vessels or units. Typical units for providing effective ion exchange are columns, which can consist of any materials, provided they do not impair the purity of the silica and withstand strong acidic media.

After the di- and higher valent metal ions have been separated according to the invention, the silica is as a rule washed with deionized water until it can be described as neutral-washed and can be dried. Neutral-washed means that the pH of the silica obtained is from 4 to 7.5 and/or the conductivity of a suspension of the washed silica in deionized water is max. 9 µS/cm, preferably max. 5 µS/cm.

The silicas obtainable by the method according to the invention are characterized in that their content of aluminium is less than 5 ppm, of boron less than 0.1 ppm, of calcium max. 0.5 ppm, of iron max. 2 ppm, of nickel max. 0.5 ppm, of phosphorus less than 0.1 ppm, of titanium max. 1 ppm and of zinc max. 0.3 ppm.

In particular the silica grades produced by the method according to the invention are characterized by exceptionally low levels of contamination with tetravalent metals. For example, the tin and zirconium contents are well under 0.1 ppm, preferably under 0.05 ppm, which is not attainable economically by other methods; the comparative example presented below clearly shows that the content of zirconium or tin impurities cannot be lowered to less than 0.1 ppm even by washing 14 times with 12% sulphuric acid.

The high-purity silicas obtainable by the method can be further processed to high-purity silicon for the solar industry. For this, the silicas can be reacted with high-purity carbon or high-purity sugars. Corresponding techniques are known by a person skilled in the art, for example from document WO 2007/106860 A1.

The silica accessible via the invention can also serve as high-purity raw material for the production of especially pure quartz glass for optical waveguides, glassware for the laboratory and electronics, as catalyst supports and as starting material for the production of high-purity silica sols, which are used for polishing high-purity silicon wafers in the so-called CMP process.

In the following, the invention is described with an example and a comparative example, without this description imposing any restriction with respect to the scope of the invention:

EXAMPLE

A 6-L apparatus made of borosilicate glass was charged with 4.5 kg (3950 ml) of 20% sulphuric acid (analytical grade) without any other addition. The temperature was 23° C. and the perforated plate contained in the apparatus was removed.

Using a peristaltic pump (300 rev/min, 8.0 mm hose), 1400 g of 40/42 waterglass (30%) was introduced via a priller or a PTFE perforated plate with 1.4-mm holes. No blind grains were formed. After 5.5 minutes, waterglass feed was completed; the temperature after prilling was 30° C. Even before the start of prilling or waterglass addition, an ion exchanger column with a volume of 1000 ml was installed, so that the prilling solution could already be led over the ion exchanger during prilling. For this, after cleaning with 10% sulphuric acid, the column was filled to a height of 60 cm or 700 ml with Purolite S957®. The speed of the circulating pump was 75 rev/min or 280 g/min. In total, it was pumped round for 2.5 hours at room temperature (sample 932), then heated to 80° C. and pumped round at this temperature for a further 2 hours via the same ion exchanger column (sample 933).

Then it was modified to a second 1000-ml ion exchanger column, which had been cleaned beforehand with 10% sulphuric acid and had been filled to a height of 60 cm with Lewatit® TP 260. It was again pumped round via this column for 2 hours at a temperature of 80° C. and then discharged. The solution had a volume of 4400 ml and a mass of 4870 g. After discharge, the sulphuric acid still had a concentration of 12.69%, a pH of 0.00 and a conductivity of 496 mS/cm.

Next, instead of the column filled with Lewatit® TP 260, once again a column containing approx. 700 ml Purolite 5957® was installed, which only differed from the column used first in that it was cleaned beforehand or conditioned with only 2% sulphuric acid. After adding 3500 g of deionized water, it was left to stand overnight. On the next day the apparatus was heated to 80° C. again and circulated for 2 hours at 75 rev/min or 280 g/min. Then it was discharged and converted to circulation without ion exchanger column. The sulphuric acid had a concentration of 2.06%, a pH of 0.72 and a conductivity of 95.0 mS/cm. Sample 934 was taken in this stage of the process.

For neutral-washing of the silica, in each case it was filled with 3500 g deionized water and pumped round for 30 minutes. It was washed in this way with deionized water a total of 7 times, and as a result a conductivity of 2 μS/cm was reached.

| Washing step | Temp. [° C.] | Time [min] | pH | Conductivity [μS/cm] | Remarks |
|---|---|---|---|---|---|
| 1st water step | 80 | 30 | 1.52 | 14890 | |
| 2nd water step | 80 | 30 | 2.36 | 2460 | |
| 3rd water step | 90 | 30 | 3.42 | 342 | |
| 4th water step | 80 | 30 | 4.10 | 43 | |
| 5th water step | 80 | 30 | 4.79 | 9 | |
| 6th water step | 40 | 30 | 5.77 | 2 | cold |
| 7th water step | 29 | 30 | 5.35 | 2 | cold |

The product was transferred to a quartz glass dish, dried at 160° C. in the drying cabinet and analysed (sample 935).

The ion exchangers of the three columns were regenerated using alkaline tartrate solution, and the salt burden was removed from the sulphuric acid in an acid retardation process.

The total acid consumption for the prilling step, in which 1400 g of 40/42 waterglass and/or 420 g $SiO_2$ were used, was 4.5 kg of 20% sulphuric acid or 900 g $H_2SO_4$.

Extrapolated, for the production of one kilogram of high-purity silica this gives a consumption of 2.14 kg $H_2SO_4$.

| | Unit | | | | | | | | | | | |
|---|---|---|---|---|---|---|---|---|---|---|---|---|
| Sample designation | Al ppm | B ppm | Ba ppm | Ca ppm | Co ppm | Cr ppm | Cu ppm | Fe ppm | Hf ppm | K ppm | Mg ppm | Mn ppm |
| Sample 931, PIB2009-001, Test 77, WGL 40/42 Std., Sample after first column S957 2 h | 11 | 0.01 | 0.75 | 3.3 | <0.01 | 1 | 0.03 | 18 | 0.09 | 35 | 1.5 | 0.08 |
| Sample 932, PIB2009-001, Test 77, WGL 40/42 Std., Sample after first column S957 2 h | 3.4 | | 0.33 | 1.4 | | 0.09 | 0.06 | 2.7 | <0.01 | 27 | 1.3 | 0.06 |
| Sample 933, PIB2009-001, Test 77, WGL 40/42 Std., Sample after second column TP260 2 h | 0.24 | | 0.21 | 0.51 | | 0.02 | 0.01 | 0.93 | | 10 | 0.47 | 0.02 |
| Sample 934, PIB2009-001, Test 77, WGL 40/42 Std., Sample after third column S957 2 h | 0.24 | | 0.06 | 0.29 | | 0.01 | | 0.92 | | 3.5 | 0.06 | |
| Sample 935, PIB2009-001, Test 77, WGL 40/42 Std., 1st and 2nd column in prilling, 3rd column | 0.12 | | 0.02 | 0.13 | | 0.01 | 0.01 | 0.66 | | | 0.04 | 0.01 |

| | Unit | | | | | | | | |
|---|---|---|---|---|---|---|---|---|---|
| Sample designation | Na ppm | Ni ppm | P ppm | Pb ppm | S ppm | Sn ppm | Ti ppm | Zn ppm | Zr ppm |
| Sample 931, PIB2009-001, Test 77, WGL 40/42 Std., Sample after first column S957 2 h | 6900 | 0.07 | 0.42 | 0.03 | 22000 | 0.06 | 16 | 0.1 | 0.44 |
| Sample 932, PIB2009-001, Test 77, WGL 40/42 Std., Sample after first column S957 2 h | 5800 | 0.04 | 0.56 | 0.02 | 18000 | 0.05 | 0.47 | 0.36 | 0.03 |
| Sample 933, PIB2009-001, Test 77, WGL 40/42 Std., Sample after second column TP260 2 h | 2600 | 0.03 | 0.57 | <0.01 | 6600 | 0.03 | 0.12 | 0.11 | 0.02 |
| Sample 934, PIB2009-001, Test 77, WGL 40/42 Std., Sample after third column S957 2 h | 610 | 0.06 | 0.34 | | 2100 | 0.03 | 0.14 | 0.08 | 0.02 |
| Sample 935, PIB2009-001, Test 77, WGL 40/42 Std., 1st and 2nd column in prilling, 3rd column | 1.2 | 0.17 | 0.08 | | 1.5 | 0.03 | 0.11 | 0.07 | 0.02 |

COMPARATIVE EXAMPLE

The 6-L apparatus used for the example described above was charged with 4.5 kg of 13.5% sulphuric acid and 10 g of a 35% hydrogen peroxide solution. The temperature was 24° C. and the perforated plate contained in the apparatus was removed. Using a peristaltic pump (700 rev/min, 8.0 mm hose), 3000 g of 40/42 waterglass was introduced via a priller or a PVDF perforated plate with 2-mm holes. The granules were somewhat larger initially, but assumed a normal size after a few minutes. After 17 minutes, waterglass feed was completed. It was not possible to add more than 3000 g, as otherwise the sulphuric acid would have been neutralized completely. The temperature was 32° C. after prilling. After circulating by pump for a further 20 minutes, it was discharged. After prilling, the sulphuric acid had a concentration of 3.30%, a pH of 0.79 and a conductivity of 148 mS/cm.

Then it was washed twelve times, in each case with 3500 g of 12% sulphuric acid and then twice more with 12% sulphuric acid of analytical grade; for this, it was circulated with a peristaltic pump (100 rev/min, 8.0 mm hose) at a pumping rate of 470 ml/min.

| Washing step | Temperature [° C.] | Time [min] | Remarks |
|---|---|---|---|
| 1st acid step | cold (25° C.) | 5 | |
| 2nd acid step | cold (24° C.) | 5 | |
| 3rd acid step | cold (25° C.) | 30 | |
| 4th acid step | cold (25° C.) | 30 | |
| 5th acid step | cold (25° C.) | 60 | +10 g H$_2$O$_2$ |
| 6th acid step | 80° C. | 30 | |
| 7th acid step | 80° C. | 30 | |
| 8th acid step | 80° C. | 30 | |
| 9th acid step | 80° C. | 30 | |
| 10th acid step | 80° C. | 30 | |
| 11th acid step | 80° C. | 30 | |
| 12th acid step | 80° C. | 30 | |
| 13th acid step | 80° C. | 30 | analytical-grade acid, overnight |
| 14th acid step | 80° C. | 30 | analytical-grade acid |

Finally it was filled in each case with 3500 g deionized water and circulated by pump for 30 minutes.

Finally it was washed a further thirteen times with deionized water, until a conductivity of 1 μS/cm was reached.

| Washing step | Temp. [° C.] | Time [min] | pH | Conductivity [μS/cm] | Remarks |
|---|---|---|---|---|---|
| 1st water step | 46 | 30 | 0.49 | 150300 | cold |
| 2nd water step | 33 | 30 | 0.88 | 40400 | cold |
| 3rd water step | 28 | 30 | 1.45 | 12960 | cold |
| 4th water step | 26 | 30 | 1.98 | 4210 | cold |
| 5th water step | 80 | 30 | 2.49 | 1266 | |
| 6th water step | 49 | 30 | 3.06 | 344 | cold |
| 7th water step | 34 | 30 | 3.60 | 87 | cold |
| 8th water step | 80 | 30 | 4.21 | 24 | |
| 9th water step | 48 | 30 | 5.05 | 5 | cold |
| 10th water step | 34 | 30 | 4.65 | 10 | cold, overnight |
| 11th water step | 80 | 30 | 5.25 | 3 | |
| 12th water step | 49 | 30 | 5.65 | 1 | cold |
| 13th water step | 34 | 30 | 5.60 | 1 | cold |

The product was transferred to a porcelain dish, dried at 160° C. in the drying cabinet and analysed (sample 837).

The total acid consumption was 4.5 kg of 13.5% sulphuric acid for the prilling step and 49 kg of 12% sulphuric acid for the washing process; this corresponds to 6488 g H$_2$SO$_4$.

The 3000 g of 40/42 waterglass used corresponds to 900 g silica, giving a consumption of 7.21 kg H$_2$SO$_4$ for the production of one kilogram of high-purity silica.

| | Al ppm | B ppm | Ba ppm | Ca ppm | Cr ppm | Fe ppm | Mg ppm | Na ppm | Ni ppm | P ppm | S ppm | Sn ppm | Ti ppm | Zn ppm | Zr ppm |
|---|---|---|---|---|---|---|---|---|---|---|---|---|---|---|---|
| Sample 837 | 0.58 | 0.17 | 0.51 | 0.08 | 0.01 | 0.51 | 0.01 | 0.09 | 0.28 | 0.02 | 0.57 | 0.38 | 1.5 | 0.1 | 0.12 |

The contents of trace elements were determined by means of high-resolution inductively-coupled plasma-mass spectrometry (HR-ICPMS).

For this, an accurately determined mass of a 1-5 g sample of the material to be investigated is weighed in a PFA beaker and then 1 g of an approx. 1% mannitol solution and 25-30 g of approx. 50% hydrofluoric acid are added. After swirling briefly, the PFA beaker is heated to 110° C. in a heating block, so that the silicon contained in the sample as hexafluorosilicic acid and the excess hydrofluoric acid slowly evaporate. The residue is dissolved with 0.5 ml nitric acid (approx. 65%) and a few drops of hydrogen peroxide solution (approx. 30%) within about one hour and is made up to 10 g with ultrapure water.

For determining the trace elements, 0.05 ml or 0.1 ml is taken from the digested solutions, transferred to a polypropylene sample tube, 0.1 ml of indium solution (c=0.1 mg/l) is added as internal standard and it is made up to 10 ml with dilute nitric acid (approx. 3%).

From multielement stock solutions (c=10 mg/l), which contain all the elements to be analysed except indium, four calibration solutions are prepared (c=0.1; 0.5; 1.0; 5.0 μg/l), once again with addition of 0.1 ml indium solution (c=0.1 mg/l) up to a final volume of 10 ml. In addition, blank-value solutions are prepared with 0.1 ml indium solution (c=0.1 mg/l) to 10 ml final volume.

The contents of the elements in the blank value, calibration and sample solutions thus prepared are determined by high-resolution inductively-coupled mass spectrometry (HR-ICPMS) with external calibration. Measurement is performed with a mass resolution (m/Δm) of at least 4000 or—for the elements potassium, arsenic and selenium—of at least 10000.

The invention claimed is:
1. A method of producing high-purity silica, the method comprising:

(a) producing a preparation from an acidifying agent or an acidifying agent and water with a pH of less than 2;
(b) preparing a silicate solution with a viscosity from 0.1 to 10000 poise;
(c) adding the silicate solution from step (b), to the preparation from step (a) thereby forming a precipitate suspension comprising a liquid phase and precipitated silica, where the pH of the resultant precipitate suspension always remains at a value less than 2;
(d) separating and washing the silica with a washing medium having a pH of less than 2;
(e) neutral washing the silica with deionized water; and
(f) drying the silica;
wherein at least one aminomethylphosphonic acid ion exchanger is brought in contact, for the purpose of ion exchange, with the liquid phase of the precipitate suspension during precipitation of the silica within step (c), or with the washing medium within step (d), or with both,
and wherein the ion exchanger is regenerated with an alkaline solution comprising tartrate.

2. The method according to claim 1, wherein the liquid phase of the precipitate suspension during precipitation of the silica within step (c), or of the washing medium within step (d), or both, which is brought in contact with at least one aminomethylphosphonic acid ion exchanger, is circulated by pump or is moved in order to improve ion exchange.

3. The method according to claim 1, wherein the acidifying agent contained in the preparation comprises sulphuric acid.

4. The method according to claim 1, wherein the ion exchange with the aminomethylphosphonic acid ion exchanger takes place in parallel with the production of the high-purity silica or within the timeframe of the production process.

5. The method according to claim 1, wherein the production of the high-purity silica is a continuous or a discontinuous process.

6. The method according to claim 1, wherein regeneration of the aminomethylphosphonic acid ion exchanger occurs in parallel with the production of the high-purity silica.

7. The method according to claim 1, wherein the liquid phase of the precipitate suspension during precipitation of the silica within step (c), or the washing medium within step (d), or both, are purified through the use of an acid retardation process.

* * * * *